Dec. 31, 1968    JEAN-CLAUDE RAMOND    3,419,152
CENTRIFUGAL PURIFIER
Filed Sept. 18, 1967
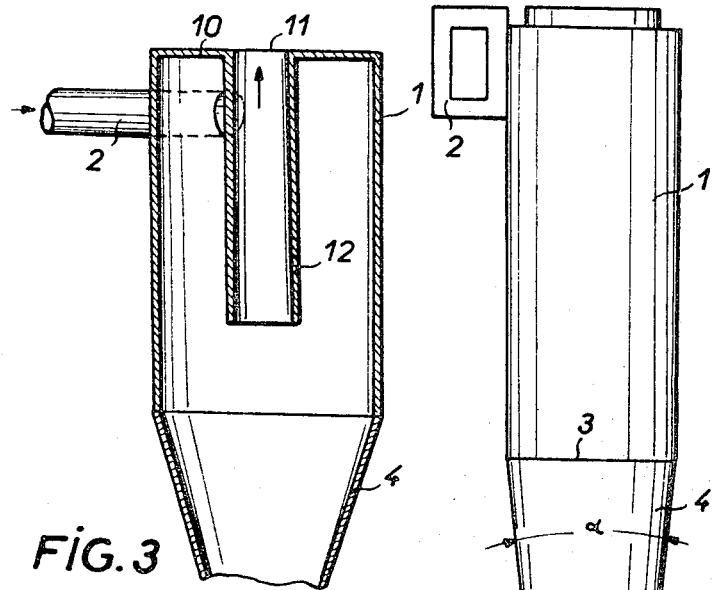
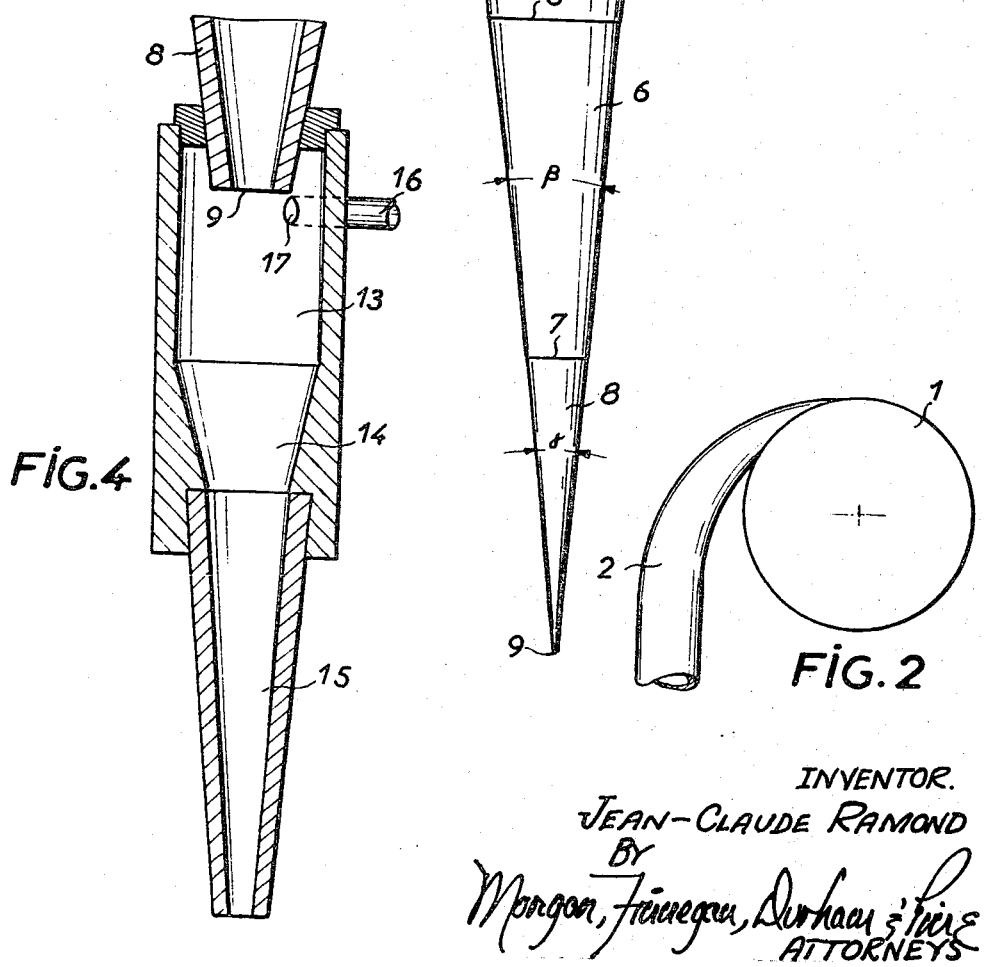
INVENTOR.
JEAN-CLAUDE RAMOND

United States Patent Office 3,419,152
Patented Dec. 31, 1968

3,419,152
CENTRIFUGAL PURIFIER
Jean-Claude Ramond, Rueil-Malmaison, France, assignor to D.I.P.A., Paris, France, a company of France
Filed Sept. 18, 1967, Ser. No. 668,621
Claims priority, application France, Sept. 22, 1966, 77,279
5 Claims. (Cl. 210—512)

ABSTRACT OF THE DISCLOSURE

Centrifugal purifier for separating impurities contained in a suspension of a solid, granular or fibrous product, in a liquid phase of the type comprising a cylindrical chamber, with a helical feed tube, to which chamber is joined a conical chamber at the base, in which this conical chamber is made up of a plurality of conical sections with differing apex angles.

---

The present invention relates to a centrifugal purifier for use particularly in separating impurities contained in a solid, granular or fibrous material suspended in a liquid.

A centrifugal purifier consists basically of a helix connected at the bottom to a cylindrical chamber which is connected to a conical chamber whose geometrical apex forms the base of the device.

Such a purifier is used for example in the paper industry to eliminate impurities contained in a suspension of fibres in water.

The suspension is introduced under pressure into the helix which effects the change of pressure and speed of the suspension before the suspension reaches the cylindrical chamber; in the chamber, impurities of a specific weight greater than that of the material desired are forced against the internal face, then progress through the conical chamber to the base through which they are passed, possibly after passing through a recovery device for the desired material. The treated suspension rises from the conical chamber as a whirling axial stream and passes through a central opening provided in the top of the cylindrical chamber.

In its progress towards the base of the conical chamber, i.e. as the chamber diameter decreases, the peripheral speed of the suspension increases as a direct function of the apex angle of the conical chamber. Because of this, the light impurities of a specific weight near that of the desired material tend to remain in the centre of the chamber, and consequently tend to be carried upwards with the treated suspension which is rising to the cylindrical chamber opening.

It is an object of the present invention to obviate or mitigate this problem and thus increase the efficiency of the device.

The present invention is a centrifugal purifier including a cylindrical chamber, a helical feed tube mounted at the upper end, of the cylindrical chamber, an axial chimney projecting inwardly from the top surface thereof, a plurality of inverted truncated conical chambers mounted successively on the base of the cylindrical chamber and having successively decreasing apex angles and an inverted conical chamber mounted on the base of the lowest truncated chamber and having a smaller apex angle and being provided with an opening in the base.

Further, in known purifiers, the impurities pass through the base of the conical chamber, the size of the base opening being determined by the nature of the suspension and the impurities, and the pressures in the device. In order to be certain that all impurities will be passed through the opening, and that no blockage will occur, the base opening is normally of such a size that it allows the flowing off a certain percentage of desired material together with impurities. This results in a lessening of the device's efficiency.

In order to obviate or mitigate this drawback, the present invention includes a recovery device which recovers the desired material which is passed through with impurities from a purifier, and comprises a recovery device for a centrifugal purifier including a cylindrical chamber, a tangential feed tube mounted in the cylindrical chamber near to the upper end for the supply of water to the chamber and a plurality of inverted truncated conical chambers mounted successively on the base of the cylindrical chamber of the device and having successively decreasing apex angles and an inverted conical chamber mounted on the base of the lowest truncated chamber of the device and having a smaller apex angle and being provided with an opening in the base.

An embodiment of the present invention will now be described by way of example, with reference to the accompanying drawings in which:

FIG. 1 is a diagrammatic elevation of a centrifugal purifier according to the present invention;

FIG. 2 is a plan view of the cylindrical chamber showing the feed tube;

FIG. 3 is a sectional elevation of the helical feed tube and cylindrical chamber; and FIG. 4 is a sectional elevation of a recovery device according to the present invention.

Referring now to FIG. 1, a suspension to be treated is introduced into a cylindrical chamber 1 of a purifier through a helical feed tube 2. The cylindrical chamber 1 is joined at its base 3 to a first inverted truncated conical chamber 4, the apex angle of which is approximately 10 degrees. The conical chamber 4 is joined at its base to a second inverted truncated conical chamber 6, the apex angle of which is approximately 8 degrees and the conical chamber 6 is in turn joined at its base to an inverted conical chamber 8, the apex angle of which is approximately 6 degrees. An opening 9 is provided in the base of chamber 8.

The top 10 of the chamber 1 has an opening 11 therein, (see FIG. 3) aligned with an internal chimney 12 in the chamber 1, the axial height of which chimney is between ½ and ¾ of the height of the cylindrical chamber 1, the height of the chamber 1 being at least 2½ times its diameter.

The conical chamber 8 is joined at its base to a recovery device comprising a cylindrical chamber 13 (see FIG. 4), the diameter of which is greater than the diameter of the base of the conical chamber 8. The cylindrical chamber 13, is joined at its base to an inverted truncated conical chamber 14 which is in turn joined at its base to an inverted conical chamber 15, the apex angle of which is less than that of chamber 14. A tube 16 opens into the cylindrical chamber 13 through an entry 17 and through this tube 16 water is injected under pressure while the purifier is in use.

In operation, the suspension to be treated is fed into the chamber 1, through the helix 2 under pressure and with a certain speed so as to facilitate the movement of the suspension along a helical trajectory. In the chamber 1, impurities of a specific weight greater than that of the material desired are forced against the internal face and initial separation of the suspension takes place. The desired material gathering in the centre of the chamber 1 and being forced up the chimney 12 to the opening 11 in the form of an axial stream.

The presence of chimney 12 prevents the stream from carrying with it part of the non-treated suspension which is moving towards the bottom of chamber 1. The suspension still to be treated then passes successively into the conical chambers 4, 6 and 8 where further separation of the impurities takes place and the decreasing angles of these conical chambers have the principal effect of reducing in each chamber, the difference between the peripheral speed of the impurities and that of the axial stream, so that the latter does not tend to carry with it the light impurities which have not had time to stick to the wall of the chambers or to join the layer of impurities moving along the chamber walls to the opening 9. The time taken for the suspension is then increased.

The impurities passing through the opening 9 carry with them a proportion of the required material (all in an aqueous solution). This suspension penetrates into the chamber 13 into which water under pressure is tangentially injected through the tube 16. This water has the effect of re-establishing the peripheral speed which was previously reduced and of increasing the fluidity of the suspension to allow the separation of the required material which rises to join the stream rising in the purifier. The impurities leave by the bottom of conical chamber 15.

What I claim is:

1. In a centrifugal separator having a cylindrical wall, a top closure member defining with said wall an upper cylindrical chamber, a central aperture in said top closure member, an elongated substantially conical lower chamber fixed at the other end of said cylindrical wall and having an opening at its apex, and a helical supply tube merging into said upper cylindrical chamber, the improvement therein which comprises:

mounting a discharge tube to said top closure within said upper cylindrical chamber in coaxial position with said aperture, said discharge tube having a length between 0.5 and 0.75 times the length of said upper cylindrical chamber; and the length of said upper cylindrical chamber is about 2.5 times the diameter thereof.

2. A centrifugal separator comprising, in combination:
a cylindrical wall having a length about 2.5 times its diameter;
a top closure member defining with said cylindrical wall an upper cylindrical chamber,
said top closure member having a central aperture therein;
a helical supply tube merging into said upper cylindrical chamber;
a discharge tube mounted within said upper cylindrical chamber to said top closure member in coaxial position with said aperture,
said discharge tube having a length between 0.5 and 0.75 times the length of said upper cylindrical chamber;
a plurality of inverted truncated conical chambers mounted successively on the lower end of said upper cylindrical chamber and having successively decreasing apex angles, and
an inverted conical chamber mounted to the base of the lowermost truncated conical chamber and having an apex angle of smaller size than that of said lowermost truncated conical chamber,
said inverted conical chamber being provided with an opening at its apex.

3. A centrifugal separator as claimed in claim 2, comprising two inverted truncated conical chambers mounted successively beneath said upper cylindrical chamber having apex angles of 10° and 8°, respectively, and wherein said inverted conical chamber has an apex angle of 6°.

4. A centrifugal separator comprising, in combination:
a cylindrical wall having a length about 2.5 times its diameter;
a top closure member defining with said cylindrical wall an upper cylindrical chamber,
said top closure member having a central aperture therein;
a helical supply tube merging into said upper cylindrical chamber;
a pair of inverted truncated conical chambers mounted successively beneath said upper cylindrical chamber having apex angles of 10° and 8°, respectively,
an inverted conical chamber mounted to the base of the lowermost truncated conical chamber and having an apex angle of 6°;
said inverted conical chamber discharging into a lower cylindrical chamber;
a tangential feed tube mounted on said lower cylindrical chamber near its upper end so as to supply water thereto; and
a plurality of inverted conical chambers mounted successively beneath said lower cylindrical chamber and having successively decreasing apex angles.

5. A centrifugal separator as claimed in claim 4, including
a discharge tube mounted within said upper cylindrical chamber to said top closure member in coaxial position with said aperture,
said discharge tube having a length between 0.5 and 0.75 times the length of said upper cylindrical chamber.

References Cited

UNITED STATES PATENTS

| | | | |
|---|---|---|---|
| 2,794,832 | 6/1957 | Rietema | 210—512 X |
| 2,849,930 | 9/1958 | Freeman et al. | 209—211 X |
| 2,927,693 | 3/1960 | Freeman et al. | 209—211 |
| 3,057,476 | 10/1962 | Gilbert | 210—512 X |
| 3,347,372 | 10/1967 | Bouchillon | 209—211 |

REUBEN FRIEDMAN, *Primary Examiner.*

J. DE CESARE, *Assistant Examiner.*

U.S. Cl. X.R.

209—211